United States Patent [19]

Shimizu et al.

[11] Patent Number: 5,471,620
[45] Date of Patent: Nov. 28, 1995

[54] DATA PROCESSOR WITH MEANS FOR SEPARATELY RECEIVING AND PROCESSING DIFFERENT TYPES OF INTERRUPTS

[75] Inventors: Toru Shimizu; Shunichi Iwata, both of Itami, Japan

[73] Assignee: Mitsubishi Denki Kabushiki Kaisha, Tokyo, Japan

[21] Appl. No.: 257,844

[22] Filed: Jun. 10, 1994

[30] Foreign Application Priority Data

Jun. 29, 1993 [JP] Japan ..................... 5-158827

[51] Int. Cl.⁶ .............................. G06F 13/24; G06F 9/46
[52] U.S. Cl. .................. 395/375; 364/230.2; 364/241.2; 364/262.4; 364/259.7; 364/DIG. 1; 395/734; 395/735; 395/736; 395/740
[58] Field of Search ...................................... 395/725, 325, 395/275, 425; 371/15.1, 16.3; 340/825.5, 825.51

[56] References Cited

U.S. PATENT DOCUMENTS

| | | | |
|---|---|---|---|
| 3,905,025 | 9/1975 | Davis et al. | 395/725 |
| 4,023,143 | 5/1977 | Braunstein | 395/725 |
| 4,275,440 | 6/1981 | Adams, Jr. et al. | 395/275 |
| 4,636,944 | 1/1987 | Hodge | 395/725 |
| 4,956,842 | 9/1990 | Said | 371/62 |
| 4,959,781 | 9/1990 | Rubinstein et al. | 395/725 |
| 5,115,506 | 5/1992 | Cohen et al. | 395/725 |
| 5,257,383 | 10/1993 | Lamb | 395/725 |
| 5,291,606 | 3/1994 | Okayama et al. | 395/725 |
| 5,313,640 | 5/1994 | Beardsley | 395/725 |
| 5,349,667 | 9/1994 | Kaneko | 395/725 |

OTHER PUBLICATIONS

Single–Chip 16–Bit CMOS Microcomputer, 1989 Mitsubishi Semiconductor Data Book Mitsubishi Electric Corporation, May 1989, pp. 2–15.

Primary Examiner—Gopal C. Ray
Attorney, Agent, or Firm—Lowe, Price, LeBlanc & Becker

[57] ABSTRACT

A data processor which is provided with a flag in a Processor Status Word (PSW) 116 for storing prohibiting/enabling status for receiving all of the interrupt requests, and in which the instruction execution control unit 114 controls so that the flag becomes in the enabling status when an interrupt request having a priority level is received and the flag becomes in the prohibiting status when an interrupt request having no priority level is received. Hence, for interrupt requests having priority levels, an interrupt request of high priority level can be received immediately without via the interrupt prohibiting status. For interrupt requests having priority levels, it becomes possible to receive an interrupt request of higher priority level without via the interrupt prohibiting status. For interrupt requests having no priority level such as for debugger and the like, it becomes unnecessary to perform a multi-interrupt processing.

6 Claims, 12 Drawing Sheets

FIG. 9

| INTERRUPT TYPE | | VECTOR ADD. (HEXADECIMAL) | SM | PSW UPDATED VALUE | |
|---|---|---|---|---|---|
| LARGE CLASSIFYING | SMALL CLASSIFYING (FACTOR) | | | INTERRUPT ENABLE FLAG | INTERRUPT MASK |
| DEBUGGER EXCLUSIVE INTERRUPT | PC BREAK INTERRUPT (PBI) | FFFFFFF4 | 0 | 0 | 0 |
| | DEBUGGER EXCLUSIVE INTERRUPT (DBI) | 80000000 | 0 | 0 | 0 |
| USER'S NON-MASKABLE INTERRUPT | NON-MASKABLE TERMINAL INTERRUPT (NMI) | FFFFFFA8 | 0 | 1 | 0 |
| | WATCH DOG TIMER INTERRUPT (WDTI) | FFFFFFA4 | 0 | 1 | 0 |
| USER'S MASKABLE INTERRUPT | MASKABLE INTERRUPT 0 (EI 0) | FFFFFFA0 | 0 | 1 | INTERRUPT LEVEL |
| | MASKABLE INTERRUPT 1 (EI 1) | FFFFFFBC | 0 | 1 | INTERRUPT LEVEL |
| ... | ... | ... | ... | ... | ... |

DATA PROCESSOR WITH MEANS FOR SEPARATELY RECEIVING AND PROCESSING DIFFERENT TYPES OF INTERRUPTS

BACKGROUND OF THE INVENTION

1. Field of the Invention

The present invention relates to a data processor, particularly, to a data processor which receives interrupt requests and executes a corresponding interrupt process.

2. Description of Related Art

FIG. 1 is a block diagram showing a configuration of a processor and an interrupt control circuit of a conventional data processor.

In the following, an explanation will be made on the configuration and operation for performing interrupt processings in the conventional data processor.

In FIG. 1, reference numeral 101 designates an address bus, 102 a data bus, 103 a memory, 110 a processor, and 130 an interrupt control circuit.

In addition, the memory 103, the processor 110 and the interrupt control circuit 130 are connected with each other through the address bus 101 and the data bus 102.

In the processor 110, an instruction execution control unit 114, a PSW (Processor Status Word) 116 and the like are provided. The signal lines in the processor 110 are omitted.

The instruction execution control unit 114 controls instruction execution and interrupt processing in the processor 110. Specifically, the instruction execution control unit 114 examines, when an instruction execution or an interrupt processing is finished, the state of an interrupt request signal 236, to be described later, is checked for the presence or absence of interrupt requests. When there is an interrupt request, the instruction execution control unit 114 activates the interrupt processing.

The PSW 116 is a register showing the status of the processor 110, in which, as shown in FIG. 2, a processor interrupt priority level field, an interrupt prohibition flag field and the like are set.

In the processor interrupt priority level field, the interrupt priority level possessed by the processor 110 at the present is set. The instruction execution control unit 114 of the processor 110 receives an interrupt request having a higher priority level than the processor interrupt priority level set in the PSW 116 as the interrupt request signal 236.

The value set in the processor interrupt priority level field is supplied as a processor interrupt priority level signal 213 to a maskable interrupt request generation deciding circuit 133 of the interrupt control circuit 130, described hereinafter.

On the other hand, in the interrupt prohibition flag field, an interrupt prohibition flag is set which prohibits receiving a maskable interrupt request when "1" is set, and enables receiving the maskable interrupt request when "0" is set. The set value of the interrupt prohibition flag is supplied as an interrupt prohibition flag signal 214 to the maskable interrupt request generation deciding unit 133 of the interrupt control circuit 130.

The interrupt control circuit 130 is provided with an interrupt level priority judging unit 131, the maskable interrupt request generation deciding unit 133, a non-maskable factor judging unit 134, an interrupt request holding unit 235, an interrupt information register 137, and the like.

The interrupt level priority judging unit 131 judges which interrupt request among EI0, EI1 . . . of the maskable interrupt (EI) is generated and which is the highest interrupt level among requests of the generated maskable interrupts EI0, EI1 . . . , and selects any maskable interrupt having the highest interrupt priority level.

Specifically, the interrupt level priority judging unit 131 is provided with a plurality of interrupt control registers 132 (132-0, 132-1 . . . ). To each of the interrupt control registers 132, maskable interrupt request signal 238 (238-0, 238-1 . . . ) showing that there is a request of each of the maskable interrupts EI0, EI1 . . . is supplied. Each of the interrupt control register 132-0, 132-1, . . . is a register for holding the presence or absence of an interrupt request and an interrupt level for each of the factors of the maskable interrupt EI0, EI1 . . . As shown in FIG. 3, an interrupt request bit field and an interrupt priority level field are set in the interrupt control register 132.

When there is any interrupt request from among the maskable interrupts EI0, EI1 . . . , "1" is set in an interrupt request bit in any one of the interrupt control registers 132-0, 132-1, . . . corresponding to the interrupt factor. In each of the interrupt control register 132, an intrinsic address is allocated, thereby it is possible to read/write a value of each interrupt control register 132 from the outside. Therefore, it is possible to set a priority level corresponding to each interrupt factor in advance in the interrupt priority level of each interrupt control register 132.

The maskable interrupt request generation deciding unit 133 receives an interrupt only when the set value of the interrupt prohibition flag supplied from the processor 110 as the interrupt prohibition flag signal 214 is "0" and the priority level of the maskable interrupt (EI) selected by the interrupt level priority judging unit 131 is higher than the processor interrupt priority level supplied as the processor interrupt priority level signal 213, and outputs the interrupt request to the non-maskable factor judging unit 134. But when the set value of the interrupt prohibition flag is "1" and the interrupt priority level selected by the interrupt level priority judging unit 131 is lower than the processor interrupt priority level, the interrupt request is not outputted from the maskable interrupt request generation deciding unit 133 to the non-maskable factor judging unit 134.

The non-maskable factor judging unit 134 outputs, when a non-maskable interrupt (either a watchdog timer interrupt (WDTI) or a debugger exclusive interrupt (DBI)) is given as a WDTI request signal 139 or a DBI request signal 141 is given, the request of the interrupt. That is, the non-maskable interrupts WDTI and DBI always have higher priority than the maskable interrupt (EI) and are not masked by the processor interrupt priority level or interrupt prohibition flag set in the PSW 116. When there is no request of the non-maskable interrupt WDTI or DBI, the non-maskable factor judging unit 134 outputs intact the interrupt request of the maskable interrupt (EI) given from the aforesaid maskable interrupt request generation deciding unit 133.

The interrupt request holding unit 235 holds an information showing the presence or absence of an interrupt request given from the non-maskable factor judging unit 134, and outputs the value to the instruction execution control unit 114 of the processor 110 as the interrupt request signal 236.

The interrupt information register 137 holds a priority level, vector address, or the like, of the interrupt and sends interrupt request to the processor 110. An intrinsic address is allocated to the interrupt information register 137, and the content can be read from the outside of the interrupt control circuit 130, for example, from the processor 110.

In the following, an explanation will be given on the operation of the interrupt control circuit 130.

The interrupt level priority judging unit 131 selects a request of the highest priority level from among the maskable interrupts EI0, EI1, . . . having interrupt requests by referring to contents of the interrupt control registers (132-0, 132-1 . . . ), and outputs the vector address and the interrupt priority level of the selected request to the maskable interrupt request generation deciding unit 133.

At the maskable interrupt request generation deciding unit 133, the interrupt priority level given from the interrupt level priority judging unit 131 is compared with the processor interrupt priority level signal 213 showing the processor interrupt priority level set, at that time, in the PSW 116 of the processor 110. When the given interrupt priority level is higher than the processor interrupt priority level, the maskable interrupt request generation deciding unit 133 receives the interrupt. When the interrupt is received, the maskable interrupt request generation deciding unit 133 outputs an interrupt request as well as the vector address and the interrupt priority level thereof to the non-maskable factor judging unit 134.

The non-maskable factor judging unit 134 outputs, when there is a request of a debugger exclusive interrupt (DBI) or a watchdog timer interrupt (WDTI), the interrupt request as well as a vector address and an interrupt priority level (=0) thereof. But when there are both requests, the debugger exclusive interrupt (DBI) is received prior to the watchdog timer interrupt (WDTI). When there is no request, the non-maskable factor judging unit 134 outputs intact a value sent from the maskable interrupt request generation deciding unit 133 to the interrupt request holding unit 235.

The presence or absence of an interrupt request is temporarily held in the interrupt request holding unit 235, and the value held in the interrupt request holding unit 235 is outputted to the processor 110 as the interrupt request signal 236. In addition, the vector address and the interrupt priority level are inputted from the non-maskable factor judging unit 134 to the interrupt information register 137 and held therein.

In the following, an explanation will be made on the operation of the processor 110.

Every time an instruction execution is finished or every time an interrupt processing is finished, the instruction execution control unit 114 examines the interrupt request signal 236 given from the interrupt control circuit 130 to detect the presence or absence of an interrupt request, and activates an interrupt processing when there is an interrupt request.

As per the interrupt processing done by the instruction execution control unit 114 of the processor 110, all of the following processings are performed by the hardware control.

(1) Reading of the interrupt information register

When an interrupt request is received, the instruction execution control unit 114 reads a content of the interrupt. information register 137 by using the address bus 101 and the data bus 102.

In addition, when the value of the interrupt information register 137 is read by the information execution control unit 114, an interrupt request bit of the interrupt control register 132 corresponding to the received interrupt factor is cleared to be "0" in the interrupt level priority judging unit 131.

(2) Saving of a processor information to a stack

The instruction execution control unit 114 saves such processor informations as a value of the PSW 116 (hereinafter to be called a PSW value) and a value of a program counter (not shown) (hereinafter to be called a PC value) to a stack set in the memory 103.

(3) Updating of a PSW value

The instruction execution control unit 114 sets the interrupt prohibition flag of the PSW 116 whose content has been saved temporarily to the stack by the processing of (2) to "1", as well as the substitute of the processor priority level for the received interrupt priority level.

In addition, since both of the above are given to the maskable interrupt request generation deciding unit 133 as the interrupt prohibition flag signal 214 and the processor interrupt priority level signal 213, respectively, the maskable interrupt request generation deciding unit 133 decides whether to receive or not receive the maskable interrupts (EI) according to these signals.

(4) Acquisition of a start address of an interrupt handler

A software program performing a processing corresponding to an interrupt factor is an interrupt handler.

The instruction execution control unit 114 acquires a start address of-the interrupt handler by reading the memory 103 with the vector address as a read address obtained before from the interrupt information register 137.

(5) Activation of interrupt handler

The instruction execution control unit 114 jumps the processing sequence to the start address of the interrupt handler obtained by the processing of (4). However, also at this time, the interrupt request, signal 236 is checked by the instruction execution control unit 114.

When an interrupt handler is executed by the fact that a return instruction from the interrupt handler is executed at the previous execution, the instruction execution control unit 114 makes the PSW value, and the PC value which have been saved in the stack in advance return, respectively, to the PSW 116 and PC (not shown), to return to the state before the interrupt.

As aforementioned, when an interrupt request is received, the conventional data processor prohibits to receive, by making the interrupt prohibition flag become "effective", all of the other interrupt requests having priority levels. This interrupt prohibition state continues until the interrupt prohibition flag is cleared by the interrupt handler processed at that time.

But the interrupt prohibition flag is effective only to the maskable interrupts EI0, EI1 . . . which are interrupt requests having priority levels. That is, the ones which are not received when the interrupt prohibition flag is set are only the maskable interrupts EI0, EI1 . . . having priority levels. Therefore, such interrupt requests as, such as the debugger exclusive interrupt (DBI), the watchdog timer interrupt (WDTI), and the like, having no priority level, are received even when the interrupt prohibition flag of the PSW 116 is set. In other words, an interrupt request having no priority level is always received.

As aforementioned, when an interrupt (maskable interrupt) request having a priority level is received, the conventional data processor is prohibited to receive by making the interrupt prohibition flag become "effective" in the interrupt processing, when all of the other interrupt requests have priority levels. Therefore, even when an interrupt request having higher priority level is generated while an interrupt processing is performed according to a certain interrupt request, the former interrupt request is not received immediately after the interrupt processing, but has to wait until the interrupt prohibition flag is made "ineffective" by the processing of the interrupt handler.

The conventional data processor is constructed to receive an interrupt (non-maskable) request having no priority level, and is not constructed to prohibit to receive it. Therefore, when a plurality of interrupt requests having no priority level is generated at the same time, after one interrupt processing is finished, another interrupt processing is immediately activated to perform a multi-interrupt processing.

Therefore, a conventional data processor capable of receiving a plurality of interrupts having no priority level such as a conventional interrupt for debugger has to perform interrupt processing with due regard to a multi interrupt processing, and the control method becomes complicated.

SUMMARY OF THE INVENTION

The present invention has been devised in order to solve these problems, and the object thereof is to provide a data processor capable of receiving an interrupt request of high priority immediately without passing through an interrupt prohibition state.

And another object thereof is to provide a data processor having no necessity of performing a multi-interrupt processing for an interrupt request having no priority level such as an interrupt for debugger.

The data processor related to the invention is provided with a flag which controls prohibiting/enabling for all of the interrupt requests, and controls so that the flag is in the state of enabling when an interrupt request having priority level is received and the flag is in the state of prohibition when an interrupt request having no priority level is received.

In the data processor related to the invention receives, after processing an interrupt request having priority level, an interrupt request of higher priority level is received, however, all of the interrupt requests are not received at all after processing an interrupt request having no priority level.

The above and further objects and features of the invention will more fully be apparent from the following detailed description with accompanying drawings.

BRIEF DESCRIPTION OF THE DRAWINGS

FIG. 9 is a table showing a relation between vector addresses and updated values of a PSW at every interrupt factor of one embodiment of a data processor of the invention;

DESCRIPTION OF THE PREFERRED EMBODIMENTS

In the following, an explanation will be made in detail on the invention referring Lo the drawings showing the embodiment.

Figure 4:
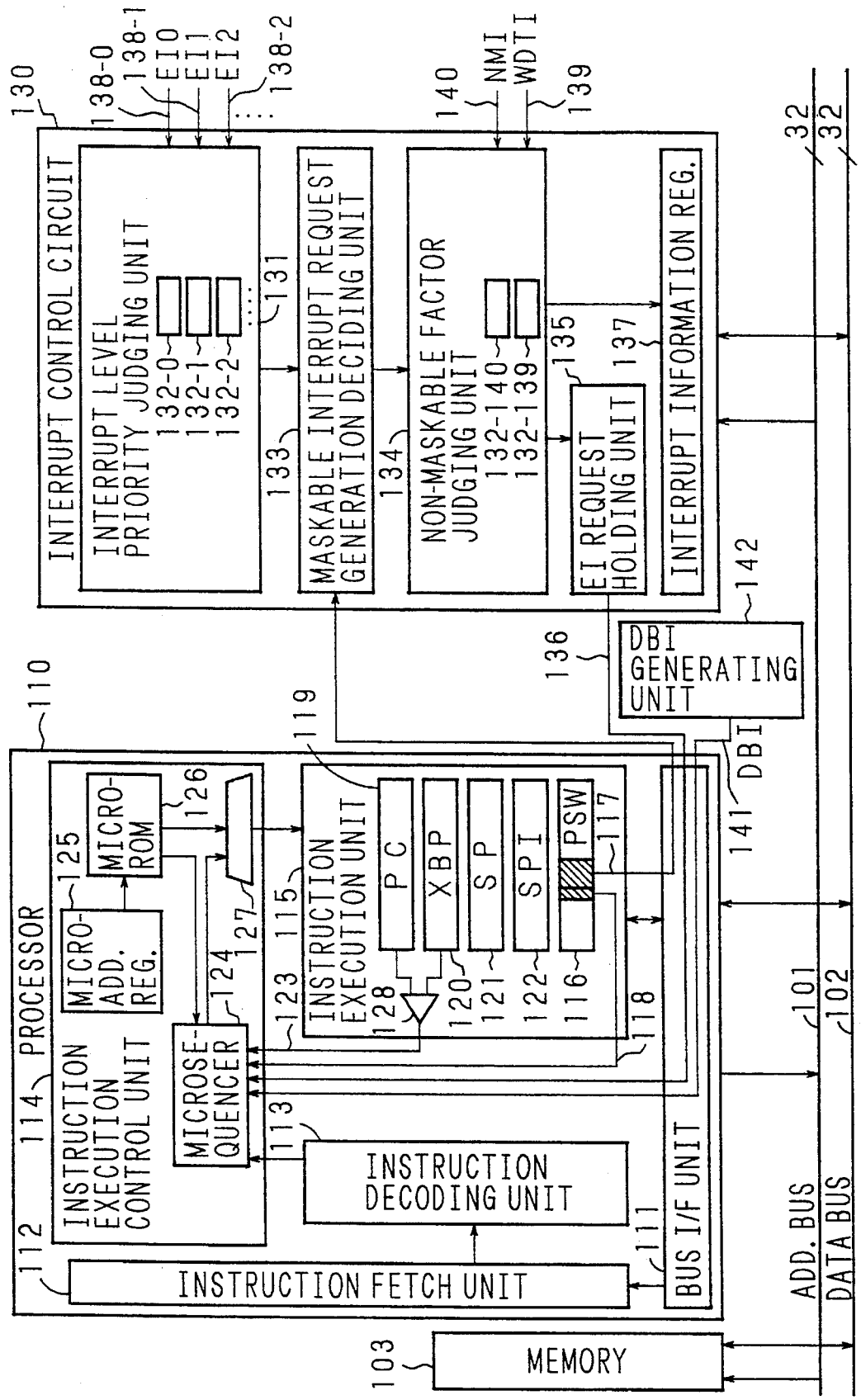
FIG. 4 is a block diagram showing a configuration of one embodiment of a data processor of the invention.

FIG. 4 is a block diagram showing a data processor, particularly, a processor and an interrupt control circuit, of the invention.

Figure 1:
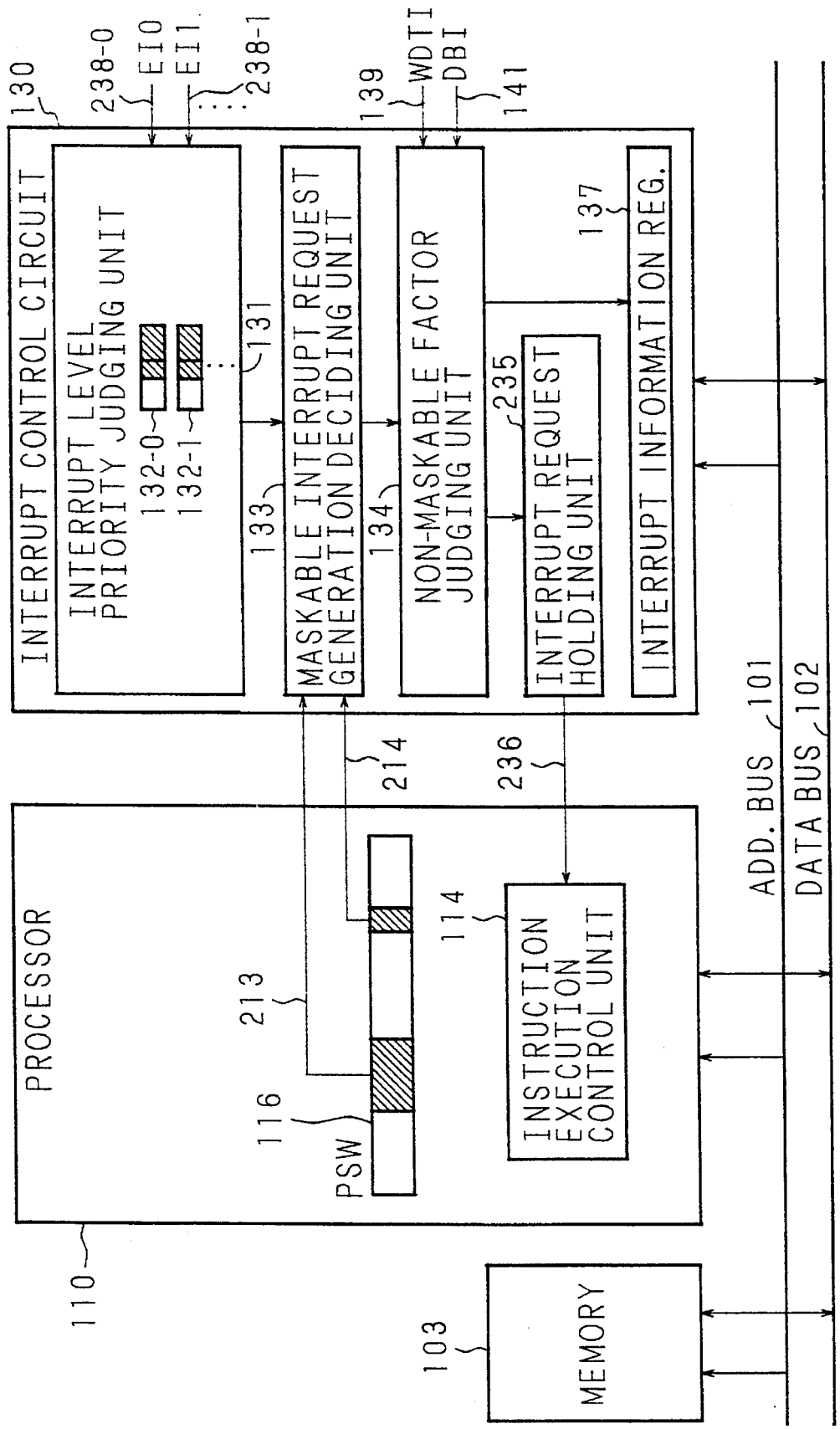
FIG. 1 is a block diagram showing an exemplary configuration of a conventional data processor.
Figure 2:
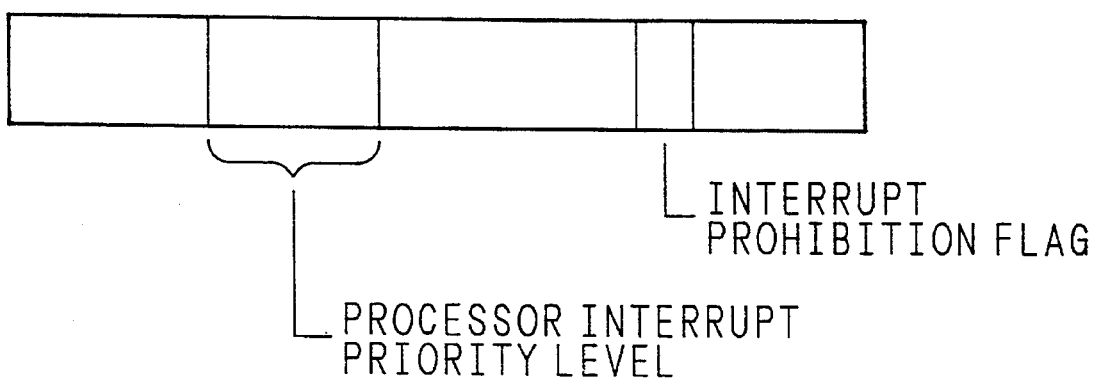
FIG. 2 is a schematic diagram showing a content in a PSW of a conventional data processor.
Figure 3:
FIG. 3 is a schematic diagram showing a content in an interrupt control register of a conventional data processor.

In addition, in FIG. 4, the same reference characters as those in FIG. 1 referred to the explanation of the aforementioned conventional example show the same or corresponding portions.

In the following, an explanation will be made particularly on the configuration and operation for performing an interrupt processing of the data processor of the invention.

In FIG. 4, reference numeral 101 designates an address bus (32 bits), numeral 102 a data bus (32 bits), numeral 103 a memory, numeral 110 a processor, and numeral 130 an interrupt control circuit.

In addition, the memory 103, the processor 110, and the interrupt control circuit 130 are connected with each other by the address bus 101 and the data bus 102.

The processor 110 of the embodiment adopts a so-called micro-program control method.

The processor 110 comprises a bus interface unit (bus I/F unit) 111, an instruction fetch unit 112, an instruction decoding unit 113, an instruction execution control unit 114, an instruction execution unit 115 and the like.

Further, the instruction execution control unit 114 comprises a microsequence 124, a microaddress register 125, a micro-ROM 126, a microdecoder 127, and the like, and the instruction execution unit 115 comprises a PSW (Processor Status Word) 116, a program counter (PC) 119, an instruction break point register (XBP) 120, a stack pointer (SP) 121, an interrupt stack pointer (SPI) 122, a comparator 128, and the like.

The bus I/F unit 111 is a hardware for connecting the processor 110 with the address bus 101 and the data bus 102, and controls the input/output of signals to and from the outside of the processor 110 such as memory access of an instruction or data.

The instruction fetch unit 112 generates an instruction fetch request for the bus I/F unit 111, and in response to the generated request, the bus I/F unit 111 takes in an instruction fetched from the memory 103 to hold it temporarily, and outputs it to the instruction decoding unit 113.

The instruction decoding unit 113 receives the instruction from the instruction fetch unit 112 and decodes it, and outputs an information (micro-program address, register number, and the like) necessary for executing the instruction to the instruction execution control unit 114.

The instruction execution control unit 114 outputs a control signal for controlling the instruction execution unit 115 on the basis of the information outputted from the instruction decoding unit 113 and an interrupt request signal 136 and description will be made hereinafter.

The instruction execution control unit 115 executes the instruction according to the control signal outputted from the instruction execration control unit 114. The instruction execution unit 115 comprises, as aforementioned, the PSW 116, program counter (PC) 119, the instruction break point register (XBP) 120, the stack pointer (SP) 121, the interrupt stack pointer (SPI) 122, the comparator 128, and the like.

In the following, an explanation will be made in detail on the instruction execution unit 115.

Figure 5:
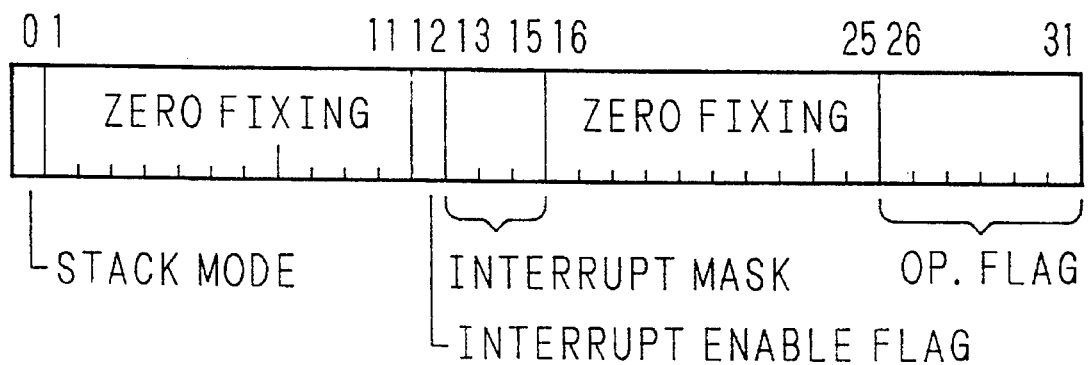
FIG. 5 is a schematic diagram showing a bit configuration of a PSW of one embodiment of a data processor of the invention.

The PSW 116 is a register for indicating the status of the processor 110, and adopts 320 bits configuration in this embodiment. In addition, the configuration of the PSW is shown in FIG. 5, and each bit has a meaning shown in the following.

---

* bit 0:     stack mode (SM)
             0: a stack pointer (SPI 121) for an external interrupt is used
             1: a usual stack pointer (SP 121) is used
* bit 1 to 11: zero fixing
* bit 12:    interrupt enable flag
             0: all of the interrupt requests are not received
             1: all of the interrupt requests are received
* bit 13 to 15: interrupt mask
             0: all of the maskable interrupt requests are not received at all
             1: maskable interrupt of interrupt level 0 is received
             2: maskable interrupts of interrupt level 0 to 1 are received
             3: maskable interrupts of interrupt level 0 to 2 are received
             4: maskable interrupts of interrupt level 0 to 3 are received
             5: maskable interrupts of interrupt level 0 to 4 are received
             6: maskable interrupts of interrupt level 0 to 5 are received
             7: maskable interrupts of interrupt level 0 to 6 are received
* bit 16 to 25: zero fixing
* bit 26 to 31: operation flag
             various kinds of flags showing operation results such as overflow flag, zero flag, and the like

---

The value of the interrupt mask which is the bit 13 to of the PSW 116 is outputted intact as an interrupt mask signal 117 of three bits, and inputted to the maskable interrupt request generation deciding unit 133 of the interrupt control circuit 130. The value of the interrupt enable flag which is bit 12 of the PSW 116 is outputted intact as an interrupt enable signal 118 of one bit to the microsequencer 124.

The PC 119 is a register for holding an instruction address being executed in the instruction execution unit 115, and adopts a 32-bit configuration in this embodiment. In addition, a content of the PC 119, that is, an instruction address is switched to an instruction address to be executed next when each instruction is finished.

The instruction break point register (XBP) 120 is a register for the debugger, and adopts a 32-bit configuration in this embodiment. The value set in this instruction break point register (XBP) 120 and the value of the PC 119 are compared with each other by the comparator 128.

Figure 6:
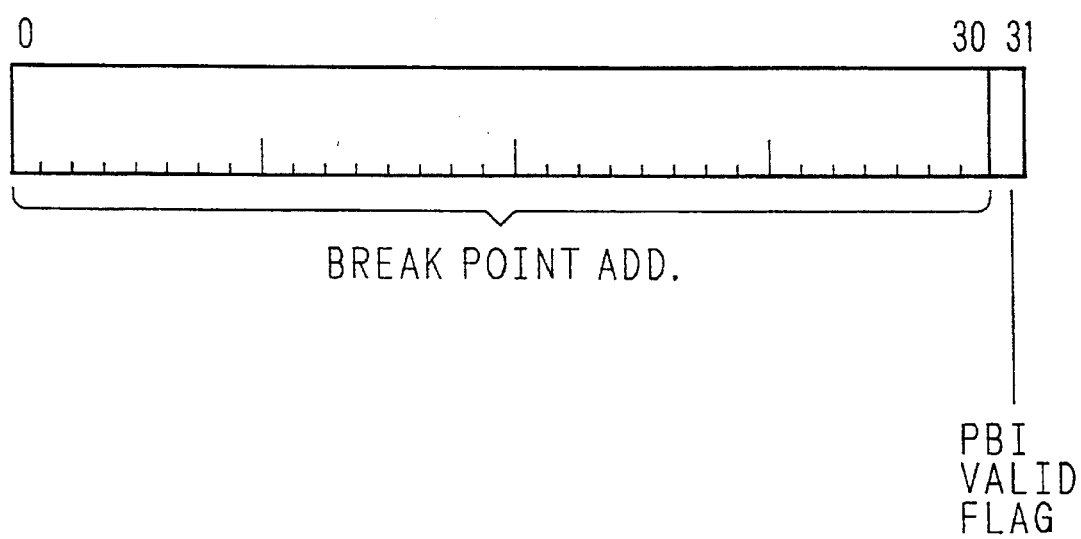
FIG. 6 is a schematic diagram showing a bit configuration of an instruction break point register (XBP) of one embodiment of a data processor of the invention.

The configuration of the instruction break point register (XBP) 120 is shown in a schematic diagram of FIG. 6, and each bit thereof has a meaning shown in the following.

---

* bit 0 to 30: break point address
               setting the higher 31 bits of value of the PC 119
               of a target at breaking an instruction execution
* bit 31:      PBI (PC break interrupt) effective flag
               0: PBI request is ineffective
               1: PBI request is effective

---

The comparator 128, as aforementioned, always compares the higher 31 bits of the value of the instruction break point registe (XBP) 120 and the higher 31 bits of the value of the PC 119 with each other. When the comparison result shows coincidence, assuming that a break interrupt request is generated, an interrupt request (PC break interrupt=PBI) is generated when an instruction being executed at that time. In other words, an instruction whose address is a value held in the PC 119, is finished. Specifically, a PBI request signal 123 which is a signal for requesting the PC break interrupt (PBI) is generated as a coincidence detection signal of the comparator 128, and is given to the microsequencer 124 of the instruction execution control unit 114.

The SP 121 is a usual stack pointer, and adopts a 32-bit configuration in this embodiment. The SP 121 is used when the stack mode of the PSW 116 is set to "1".

The SPI 122 is a stack pointer for external interrupt, and adopts a 32-bit configuration in this embodiment. The SPI 122 is used when the stack mode of the PSW 116 is set to "0".

The microsequencer 124 executes and controls a microprogram, and specifically, generates an address of a microinstruction to be executed next on the basis of an information given from the instruction decoding unit 113, a direction given from a microinstruction read from the micro-ROM 126, and each interrupt request (the aforementioned PBI request signal 123, and an interrupt enable signal 118, EI request signal 136, DBI request signal which are to be described later, and the like).

In this embodiment, a debugger exclusive interrupt (DBI) is generated by the DBI generating circuit 142 and inputted to the microsequencer 124 directly through the bus I/F unit 111.

The microaddress register 125 is given an address of a microinstruction to be read from the micro-ROM 126 and to be executed next, and holds it therein.

The micro-ROM 126 stores the microinstructions and outputs a microinstruction of an address held in the microaddress register 125.

The microdecoder 127 decodes the microinstruction outputted from the micro-ROM 126 and the signal given from the microsequencer 124 so as to generate a control signal and outputs this to the instruction execution unit 115.

The interrupt control circuit 130 comprises, as aforementioned, the interrupt level priority judging unit 131, the maskable interrupt request generation deciding unit 133, the non-maskable factor judging unit 134, the EI request holding unit 135, the interrupt information register, and the like.

The interrupt level priority judging unit 131 comprises a plurality of interrupt control registers 132 (132-0, 132-1 . .

.) to which maskable interrupt request signals 138-0, 138-1 . . . showing the presence of the user's maskable interrupt EI0, EI1 . . . are given respectively. The interrupt level priority judging unit 131 compares the contents of these interrupt control register 132-0, 132-1 . . . , thereby selects an interrupt request of highest priority from among the user's maskable interrupts EI0, EI1EI2 . . . which requested to interrupt.

Each of the interrupt control registers 132-0, 132-1 . . . adopts an eight-bit configuration in this embodiment, and holds an interrupt request bit and an interrupt level responsive to each interrupt factor. To each of the interrupt control registers 132-0, 132-1 . . . , address is allocated respectively, and it becomes possible to read/write a value of each interrupt control register 132 from the outside, for example, a processor 110 or the like.

Figure 7:
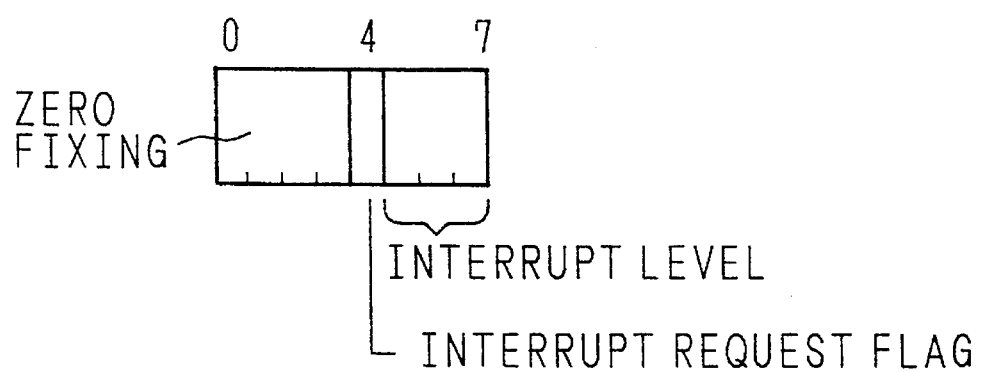
FIG. 7 is a schematic diagram showing a bit configuration of an interrupt control register of one embodiment of a data processor of the invention.

FIG. 7 is a schematic diagram showing a configuration of each of the interrupt control registers 132-0, 132-1 . . . , and each bit has a meaning shown in the following.

```
* bit 0 to 3: zero fixing
  * bit 4: interrupt request bit
          0: there is no interrupt request
          1: there is interrupt request
  * bit 5 to 7: interrupt level
          0: maskable interrupt
             : to be received when interrupt mask is 1 to
               7.
             non-maskable interrupt
             : to be received when interrupt mask is 0 to
               7.
          1: to be received when interrupt mask is 2 to 7.
          2: to be received when interrupt mask is 3 to 7.
          3: to be received when interrupt mask is 4 to 7.
          4: to be received when interrupt mask is 5 to 7.
          5: to be received when interrupt mask is 6 to 7.
          6: to be received when interrupt mask is 7.
          7: not to be received. same as that there is no
             interrupt request.
Here, the smaller the value, the higher the priority of bit 5 to 7.
In non-maskable interrupt, zero-fixing in this field.
```

The maskable interrupt request deciding unit 133 compares the interrupt level selected by the interrupt level priority judging unit 131 with the interrupt mask signal 117, that is, the interrupt mask value of the PSW 116, outputted from the processor 110, and when "interrupt level value<interrupt mask value", it receives the interrupt request and outputs the interrupt request to the non-maskable factor judging unit 134.

The non-maskable factor judging unit 134 comprises interrupt control registers 132 (132-139, 132-140) having the same configuration as the aforementioned interrupt level priority judging unit 131. To the interrupt control registers (132-139, 132-140), the WDTI request signal 139 showing the presence of the watchdog timer interrupt (WDTI) being a user's non-maskable interrupt and and an NMI request signal 140 showing the presence of a user's non-maskable terminal interrupt (NMI) of the highest priority are supplied respectively. When a request of the watchdog timer interrupt (WDTI) or a request of the user's non-maskable terminal interrupt (NMI) is given to the interrupt control register 132 (132-139, 132-140) as the signal 139 or 140, the non-maskable factor judging unit 134 outputs the interrupt request. That is, the watchdog timer interrupt (WDTI), and user's non-maskable terminal interrupt (NMI) always has higher priority than the user's maskable interrupts EI0, EI1 . . . , and are not to be masked by an interrupt mask. But when there is no request of the user's non-maskable interrupt WDTI or NMI, the non-maskable factor judging unit 134 outputs a value given from the maskable interrupt request generation deciding unit 133.

The EI request holding unit 135 holds the presence or absence of the requests of the user's maskable interrupts EI0, EI1 . . . and the user's non-maskable interrupts WDTI, NMI, and the like. This value held in the EI request holding unit 135 is outputted to the microsequence 124 of the processor 110 as the EI request signal 136. That is, the EI request signal 136 is a signal which informs the microsequencer 124 that there is a request of a user's interrupt The interrupt information register 137 adopts a 32-bit configuration in this embodiment, and holds an interrupt level, vector address, and the like of an interrupt request performing interrupt requesting to the processor 110 at present. An address 0 is allocated to this interrupt information register 137, and the content can be read from the outside, for example, the processor 110 or the like.

Figure 8:
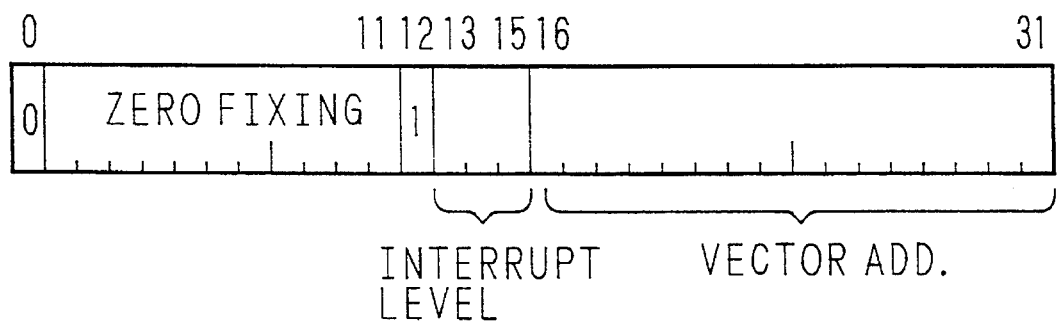
FIG. 8 is a schematic diagram showing a bit configuration of an interrupt information register of one embodiment of a data processor of the invention.

FIG. 8 is a schematic diagram showing a configuration of the interrupt information register 137, and each bit has a meaning shown in the following.

```
* bit 0 to 11: zero fixing
* bit 12 to 15: "1" fixing
* bit 13 to 15: interrupt level
* bit 16 to 31: lower 16 bits of a vector address to
                be used by sign-expanding to 32 bits.
```

FIG. 9 is a table showing a relation between a vector address and an updated value of the PSW 116 at every interrupt factor.

The interrupt requests to be received by the data processor of the invention are roughly classified to three kinds of interrupts; debugger exclusive interrupt, user's non-maskable interrupt, user's maskable interrupt.

The debugger exclusive interrupt is further classified to two kinds of factors; a PC break interrupt (PBI) and a debugger exclusive interrupt (DBI).

The PC break interrupt (PBI) is an interrupt performed in the case where a value set in the instruction break point register (XBP) 120 in advance by a program and a value of the PC 119, that is an address of an instruction being executed at the time point, are coincided with each other. Specifically, when the comparator 128 detects that a value of the PC 119 (PC value) and a value of the instruction break point register (XBP) 120 are coincided with each other, the comparator 128 generates the PBI request signal 123 and gives it to the microsequencer 124, thereby the microsequencer 124 starts interrupt-processing.

The debugger exclusive interrupt (DBI) is an interrupt used when debugging of the data processor of the invention is performed. The DBI request signal 141 which requests the debugger exclusive interrupt (DBI) can be generated from the DBI generating circuit 142, and by the fact that the DBI request signal 141 is given directly to the microsequencer 124 from the bus I/F unit 111, the microsequencer 124 begins interrupt-processing.

"FFFFFFF4 (hexadecimal)" is set as a vector address of the PC break interrupt (PBI), and "80000000 (hexadecimal)" is set as a vector address of the debugger exclusive interrupt (DBI).

The updated values of both the PC break interrupt (PBI) and the debugger exclusive interrupt (DBI) are "0" all in the stack mode (SM), the interrupt enable flag, and the interrupt mask.

The user's non-maskable interrupt is further classified to two kinds of factors; the non-maskable terminal interrupt (NMI) and the watchdog timer interrupt (WDTI).

The non-maskable terminal interrupt (NMI) is an interrupt of the highest priority among user's interrupts, which cannot be masked even by an interrupt mask of the PSW 116. The NMI request signal 140 which requests the user's non-maskable terminal (NMI) is inputted to the non-maskable factor judging unit 134 from a dedicated terminal (not shown).

The watchdog timer interrupt (WDTI) is an interrupt from a watchdog timer (not shown), and the WDTI request signal 139 which requests the watchdog timer interrupt (WDTI) is inputted to the non-maskable factor judging unit 134.

"FFFFFFA8 (hexadecimal)" is set as a vector address of the non-maskable terminal interrupt (NMI) and "FFFFFFA4 (hexadecimal)" is set as a vector address of the watchdog timer interrupt (WDTI).

Both of the updated values of the PSW 116, the non-maskable terminal interrupt (NMI) and watchdog timer interrupt (WDTI) are "0", "1", and "0" sequentially in the order of the stack mode (SM), and interrupt enable flag, interrupt mask.

The user's maskable interrupt is further classified to maskable interrupts 0, 1, 2 . . .

These user's maskable interrupts can be set optionally on a program by a user, and the requests thereof are given to each interrupt control register 132 (132-0, 132-1 . . . ) of the interrupt level priority judging unit 131 as tile maskable interrupt request signal 138 (138-0, 138-1 . . . ).

As vector addresses of user's maskable interrupts, "FFFFFFA0 (hexadecimal)", and "FFFFFFBC (hexadecimal)" are set in the order of EI0, EI1 . . .

The updated values of the PSW 116 of each user's maskable interrupt are "0", and "1" in the order of stack mode (SM) and interrupt enable flag, and the interrupt mask is each interrupt level.

Figure 10:
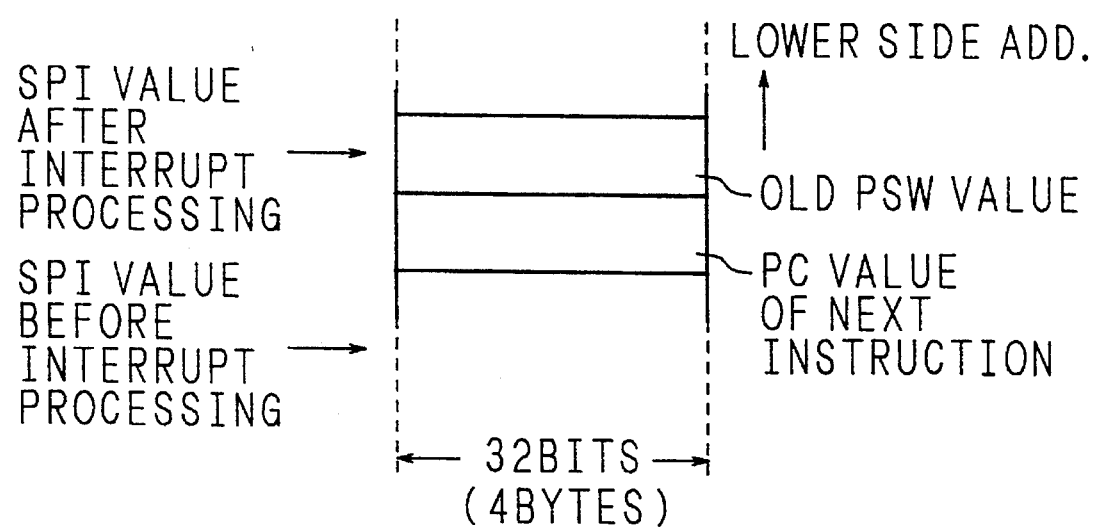
FIG. 10 is a schematic diagram showing a stack format during saving a processor information at the time of interrupt processing of one embodiment of a data processor of the invention.

FIG. 10 is a schematic diagram showing a stack format of the case where processor information, that is, a value of the PSW 116 (PSW value) and an address (next instruction PC value) of a next instruction being a value of the PC 119, are saved in the stack at the time of interrupt processing.

The stack is set as an area of 32-bit (four bytes) width in the memory 103, and saves a PC value of the next instruction to an address of −4 from the value of SPI 122 (SPI value) before interrupt processing, and the PSW value to an address of −4 from the SPI value. Accordingly, the SPI value after interrupt processing becomes a value obtained by subtracting eight from the SPI value before interrupt processing.

In the following, an explanation will be made on the operation of the interrupt control circuit 130.

The interrupt level priority judging unit 131 refers to a content of the interrupt request flag of each interrupt control register 132 (132-0, 132-1 . . . ) so as to select a request of the highest priority from among the user's maskable interrupts EI0, EI1 . . . which have interrupt requests, and sends the vector address and interrupt level of the selected interrupt to the interrupt request generation deciding unit 133. The priority level in case of no interrupt request is 7 (no request).

The maskable interrupt request generation deciding unit 133 compares the interrupt level sent from the interrupt level priority judging unit 131 with a value of an interrupt mask given as the interrupt mask signal 117 from the PSW 116 of the processor 110. When the interrupt level is smaller than the value of the interrupt mask, the interrupt is received, and the interrupt request is outputted to the non-maskable factor judging unit 134 and also the vector address and the interrupt level of the interrupt factor are outputted.

The non-maskable factor judging unit 134, when there is a request of a non-maskable terminal interrupt (NMI) being a user's non-maskable interrupt or a watchdog timer interrupt (WDTI), outputs the interrupt request, as well as outputs the vector address and the interrupt level to the interrupt information register 137. But when there are both requests at the same time, the watchdog timer interrupt (WDTI) is received prior to the non-maskable terminal interrupt (NMI). When there is neither of the requests, the non-maskable factor judging unit 134 outputs a value sent from the maskable interrupt request generation deciding unit 133 intact to the EI request holding unit 135 and the interrupt information register 137.

The presence or absence of the interrupt request from the non-maskable factor judging unit 134 is temporarily held in the EI request holding unit 135 and the value held in the EI request holding unit 135 is outputted to the microsequencer 124 of the processor 110 as the EI request signal 136. The vector address and the interrupt level are outputted from the non-maskable factor judging unit 1S4 to the interrupt information register 137 and held there.

In the following, an explanation will be made on the operation at the side of the processor 110.

At the instruction execution control unit 114, every time an instruction execution is finished or every time an instruction processing is finished, the microsequencer 124 checks the states of the EI request signal 136, the PBI request signal 123, the DBI request signal 141. When the value of the interrupt enable flag of the PSW 116 is "0", the microsequencer 124 does not receive all of the interrupt requests regardless of presence or absence of the interrupt requests. But when the value of the interrupt enable flag of the PSW is "1", the microsequencer 124 receives interrupt requests, if any, and generates a corresponding micro-program address for interrupt processing to activate an interrupt processing.

In addition, the priority of the case where a plurality of interrupt requests are generated at the same time is "PBI >DBI >EI", that is, the PC break interrupt>the debugger exclusive interrupt>the user's interrupt.

The interrupt processing is processed all by the hardware control by a procedure shown in the following.

(1) Reading of the interrupt information register

The content of the interrupt information register 137 is read out by the microsequencer 124 only when the received interrupt request is any of the user's interrupts NMI, WDTI and EI0, EI1 . . .

When the interrupt request is received, the microsequencer 124 reads the content of the interrupt information register 137, that is, the vector address and the interrupt level, by using the address bus 101 and the data bus 102.

When the content of the interrupt information register 137 is read by the microsequencer 124, the interrupt control circuit 130 clears to "0" the interrupt request bit of each interrupt control register 132-0, 132-1 . . . corresponding to the received interrupt factor.

(2) Saving of a processor information to the stack

The information execution control unit 114 saves a processor information, that is, a value of the PSW 116 (PSW value) and a value of the PC 119 (PC value) to the memory 103 according to the stack format shown in FIG. 10.

(3) Updating of a PSW value

The instruction execution control unit 114 sets the interrupt prohibition flag and the priority mask of the PSW 116 after the content thereof is temporarily saved to a stack or the like by the processing of (2).

Since both of them are given to the maskable interrupt request generation deciding unit 133 as the interrupt prohibition flag signal 214 and the processor interrupt priority level signal 213 respectively, the maskable interrupt request generation deciding unit 133 decides whether or not to receive the interrupt requests after that according to these signals.

In case of EI: When the received interrupt request is any of the user's interrupts NMI, WDTI, EI0, EI1 . . . , the microsequencer 124 sets the interrupt enable flag of the PSW 116 to "1" and substitutes the interrupt mask for an interrupt level obtained from the interrupt information register 137.

In case of PBI, and DBI: When the received interrupt request is either the PC break interrupt (PBI) or the debugger exclusive interrupt, the microsequencer 124 makes the interrupt enable flag of the PSW 116 be "0" and the interrupt mask "0".

(4) Acquisition of a start address of an interrupt handler

In case of EI: When the received interrupt request is any of the user's interrupts NMI, WDTI, EI0, EI1 . . . , the microsequencer 124 makes a vector address obtained from the interrupt information register 137 be sign-expanded to 32 bits and reads the memory 103 with it being as the address.

In case of PBI: When the received interrupt request is the PC break interrupt (PBI), the microsequencer 124 reads an address "FFFFFFFF4 (hexadecimal)" of the memory 103.

In case of DBI: When the received interrupt request is the debugger exclusive interrupt (DBI), the microsequencer 124 reads an address "80000000 (hexadecimal)" of the memory 103.

(5) Activating of interrupt handler

The microsequencer 124 jumps the processing sequence to the start address of the interrupt handler obtained by the processing of (4). However, also at this time, checking of an interrupt receiving, that is, checking of the interrupt request signal 236 is performed by the instruction execution control unit 114.

The software program performing a processing corresponding to an interrupt factor is an interrupt handler. At the time of executing the interrupt handler, by the fact that a REIT instruction being a return instruction from the interrupt handler is executed at the last, the microsequencer 124 returns the PSW value and the PC value saved before in a stack to the PSW 116 and the PC 119 respectively, thereby returns to a state before interruption.

In such a way, the data processor of the invention prepares a user's interrupt having an interrupt level and two kinds of interrupts for debugging having no interrupt level, and is provided with flags for prohibiting all of the interrupt requests. And by the fact that the data processor of the invention controls so that it is in the "interrupt enabling state" when a user's interrupt request having interrupt level is received and it is in the "interrupt prohibition state" when a request of an interrupt for debugger having no interrupt level is received, thereby, for the interrupt requests having the interrupt level, a request of an interrupt of high priority, can be received in high speed and for an interrupt for debugger having no interrupt level can be controlled so that it is not processed with the other interrupt request in a multi-interrupt processing.

Figure 11:
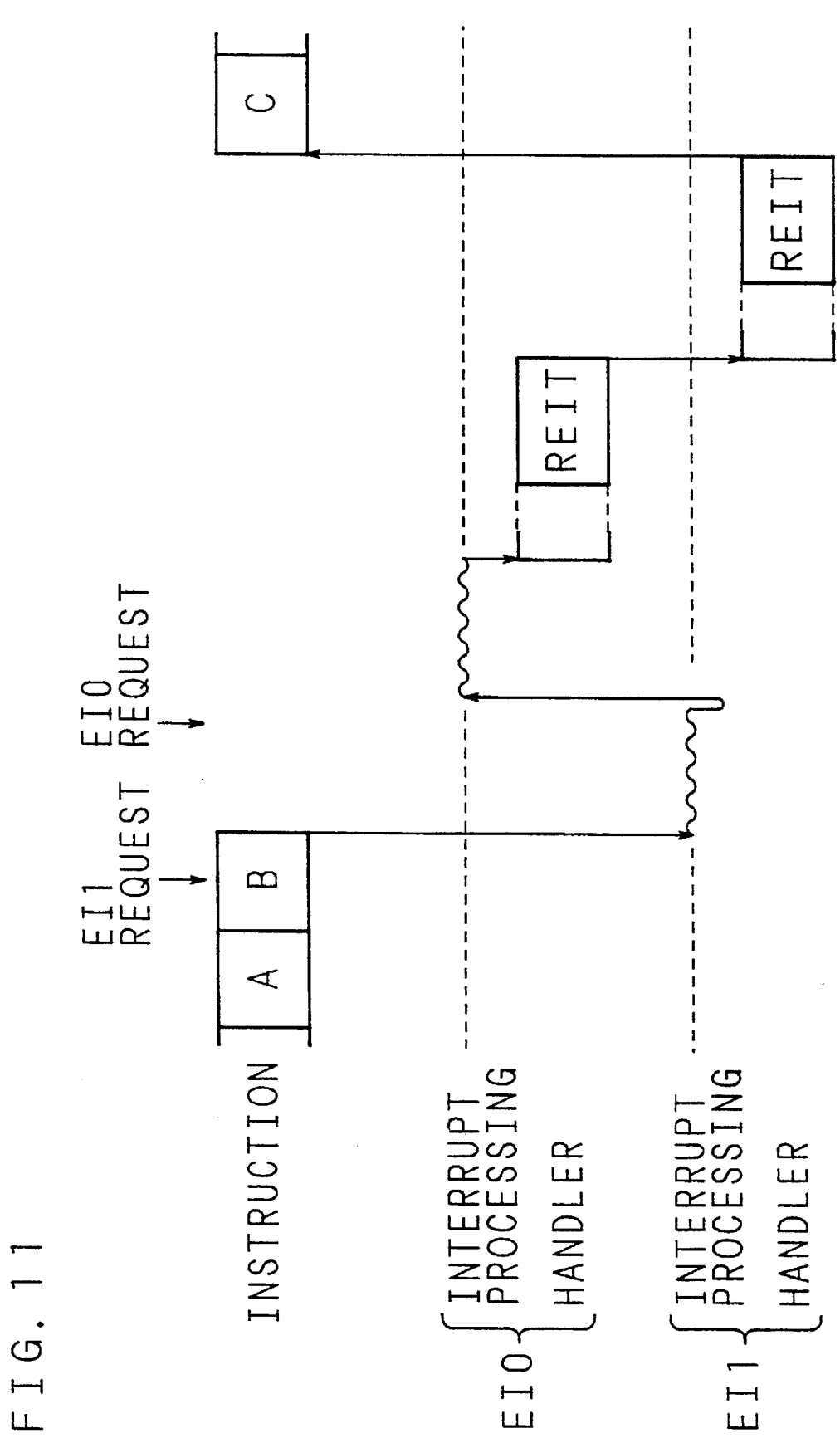
FIG. 11 is a flowchart showing an execution sequence of one embodiment of a data processor of the invention during an interrupt processing of an interrupt having low priority level, where an interrupt having higher priority level is generated.

Next, explanation will be given on an execution sequence, for interrupt requests having interrupt levels, of the case where an interrupt of higher priority is generated while an interrupt of lower priority is being processed. Here, as an example, an explanation will be given on the case where an interrupt request of EI0 (interrupt level=0) of the user's maskable interrupts is generated while EI1 (interrupt level= 1) of the user's maskable interrupt is being interrupt-processed, referring to a flowchart of FIG. 11.

(1) Generation of the request of the user's maskable interrupt EI

It is assumed that the user's maskable interrupt EI1 of interrupt level=1 is generated while an instruction B is being executed at the time of executing instructions A, B, C sequentially.

Values of the PSW 116 (PSW value) when the execution of the instruction B is finished are as follows.

stack mode: 1
interrupt enable flag: 1
interrupt level: 7

(2) Execution of interrupt processing of the user's maskable interrupt EI1

After the instruction B is finished, the interrupt processing for the user's maskable interrupt EI1 is executed.

And it is assumed that, during processing of the user's maskable interrupt EI1, a request of the user's maskable interrupt EI0 (interrupt level=0) is generated.

The content of the stack to be formed is as follows.

old PSW value: PSW value at the time of the execution of the instruction B is finished
next instruction PC value: PC value of the instruction C New PSW values are as follows.

stack mode: 0
interrupt enable flag: 1
interrupt level: 1

(3) Execution of interrupt processing of the user's maskable interrupt EI0

After the interrupt processing of the user's maskable interrupt EI1 is finished, the interrupt processing of the user's maskable interrupt EI0 is executed.

A stack to be formed further on the stack of EI1 is as follows:

old PSW value: PSW value immediately after the EI1 interrupt processing
next instruction PC value: PC value of a start instruction of the interrupt handler for EI1

New PSW value are as follows:

stack mode: 0
interrupt enable flag: 1
interrupt level: 0

(4) Execution of the interrupt handler for the user's maskable interrupt EI0

When the interrupt processing of the user's maskable interrupt EI0 is finished, the interrupt handler for the user's maskable interrupt EI0 is executed.

(5) Execution of the interrupt handler for the user's maskable interrupt EI1

When the interrupt handler for the user's maskable interrupt EI0 is finished, the interrupt handler for the user's maskable interrupt EI1 is executed.

(6) Execution of the instruction C

When the execution of the interrupt handler for the user's maskable interrupt EI1 is finished, the instruction C is executed.

In such a way, for the interrupt request having the interrupt level, the data processor of the invention proceeds, when an interrupt request of higher priority is generated while an interrupt processing of lower priority is being performed, to the interrupt processing of higher priority immediately after the interrupt processing of lower priority is finished.

Figure 12:
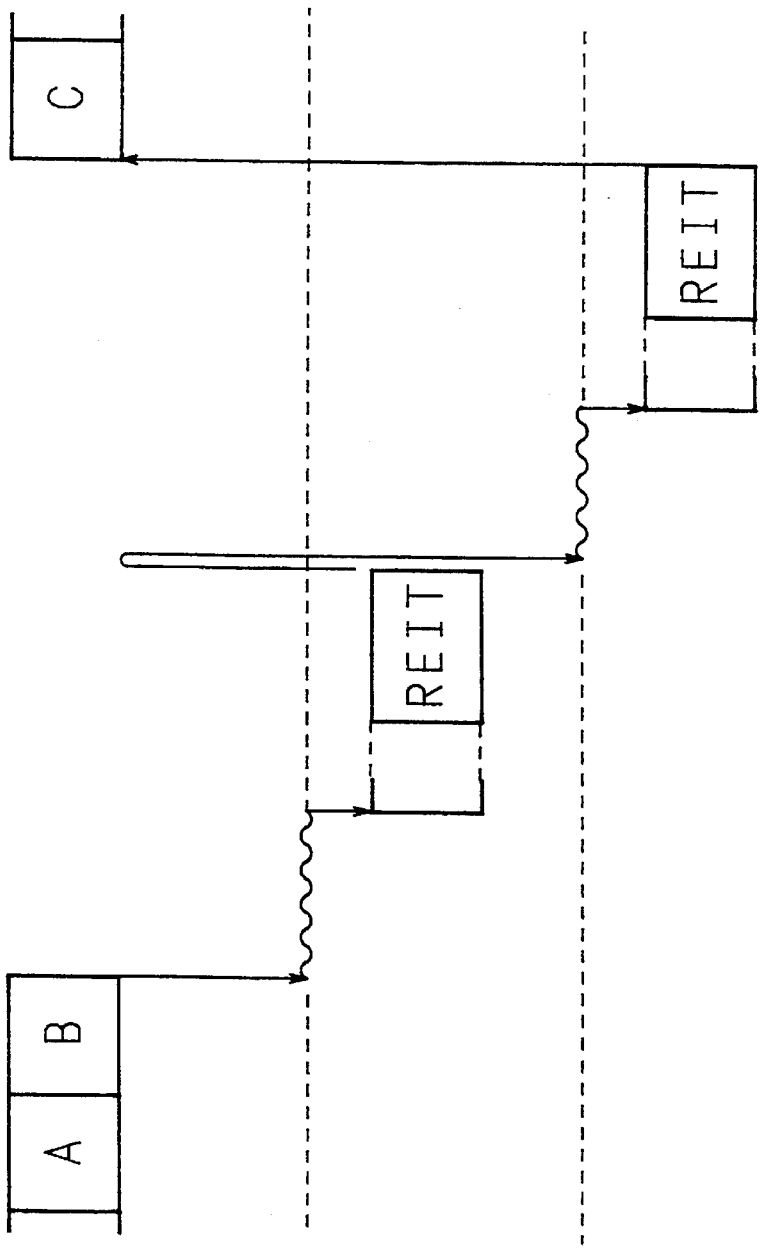
FIG. 12 is a flowchart showing an execution sequence of a data processor of the invention, in the case where a PC break interrupt and an NMI terminal interrupt are generated at the same time.

Next, an explanation will be given on the execution sequence of the case where an interrupt for debugging having no interrupt level is generated together with the other interrupt request at the same time, referring to the flowchart of FIG. 12.

(1) Generation of the PBI request and the NMI request at the same time

It is assumed that the PBI (PC break interrupt) request and the NMI (non-maskable terminal interrupt) request are generated at the same time while the instruction B is being executed at the time of executing the instructions A, B, C sequentially.

The PSW values when the execution of the instruction B is finished are as follows:

|   |
|---|
| stack mode: 1 |
| interrupt enable flag: 1 |
| interrupt level: 7 |

(2) Execution of the PBI interrupt processing

After the instruction B is finished, the PC break interrupt (PBI) processing (PBI interrupt processing) is executed.

The stack to be formed is as follows:

| | |
|---|---|
| old PSW value: | PSW value when the instruction B is finished |
| return-destination PC value: | PC value of the instruction C |
| New PSW values are as follows: | |
| stack mode: | 0 |
| interrupt enable flag: | 0 |
| interrupt level: | 0 |

Since the interrupt enable flag becomes "0", an interrupt request is not to be received after an interrupt processing is finished.

(3) Execution of the PBI interrupt handler

The interrupt handler (PBI interrupt handler) for PC break interrupt (PBI) is executed after the processing of the PC break interrupt (PBI) is finished.

When the PBI interrupt handler is finished, the processing returns to the state where the instruction B is finished.

(4) Execution of the NMI interrupt processing

When the PBI interrupt handler is finished, the non-maskable terminal interrupt (NMI) processing (NMI interrupt processing) is executed.

The stack to be formed is as follows:

| | |
|---|---|
| old PSW value: | PSW value when the execution of the instruction B is finished |
| return-destination PC value: | PC value of the instruction C |
| New PSW value are as follows: | |
| stack mode: | 0 |
| interrupt enable flag: | 1 |
| interrupt level: | 0 |

(5) Execution of the NMI interrupt handler

The interrupt handler for NMI interrupt, is executed when the NMI interrupt processing is finished.

(6) Execution of the instruction C

When the NMI handler is finished, the instruction C is executed.

In such a way, for an interrupt request having no interrupt level, in the data processor of the invention, the other interrupt processing is not to be activated when the interrupt processing of the former is finished.

In addition, the target of the PC break interrupt (PBI) of the embodiment is an instruction being executed, however, the next instruction can be made a target by making the PC store an address of the next instruction.

As described aforementioned, according to the data processor of the invention, as for a request of an interrupt having priority level, since an interrupt enable flag is set to the "enabling" state at the time of the interrupt processing, in the case where an interrupt request of higher priority has been generated at that time, it becomes possible to receive the interrupt request immediately after the interrupt processing. And as for a request of an interrupt having no priority level such as for debugger, etc., since an interrupt enable flag is set to the "prohibition" state at the time of the interrupt processing, the other interrupt request is not to be received after the interrupt processing. In other words, since interrupt requests are not received, a complicated control is not necessary.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A data processor, comprising:

first interrupt requesting means for informing a first interrupt request which is generated on the basis of a first interrupt factor and requests activation of a first interrupt processing;

second interrupt requesting means for informing a second interrupt request which is generated on the basis of a second interrupt factor and requests activation of a second interrupt processing;

third interrupt requesting means for informing a third interrupt request which is generated on the basis of a third interrupt factor and requests activation of a third interrupt processing;

instruction executing means for executing said first, second and third interrupt processings;

controlling means for receiving said first, second and third interrupt requests, and for activating execution of said interrupt processing corresponding to respective received interrupt request done by said instruction executing means; and storing means for storing two statuses; either the enabling status where said controlling means receives an interrupt request or the prohibiting status where said controlling means does not receive an interrupt request;

wherein said controlling means when said storing means stores the prohibiting status, does not activate any of said first, second and third interrupt processings, when said storing means stores the enabling status, and said first interrupt request is generated, makes said storing means store the prohibiting status and activates said first interrupt processing regardless of the presence or absence of the generation of said second interrupt request and said third interrupt request, when said storing means stores the enabling status, and said first, interrupt request is not generated and said second interrupt request is generated, makes said storing means store the prohibiting status and activates said second interrupt processing regardless of the presence or absence of the generation of said third interrupt request, and when said storing means stores the enabling status, and both said first interrupt request and said second interrupt request are not generated, and said third interrupt request is generated, makes said storing means hold the enabling status and activates said third interrupt processing.

2. A data processor as set forth in claim 1, wherein said controlling means comprises:

a micro-program memory which stores microinstructions for controlling changing of the stored content of said storing means and for executing said first, second and third interrupt processings; and a microsequencer for specifying addresses for reading out from said micro-program memory microinstructions corresponding to the presence or absence of interrupt request from said first, second and third interrupt requesting means and to the stored content of said storing means.

3. A data processor as set forth in claim 1, wherein said instruction executing means comprises instruction address specifying means for specifying an address of an optional instruction in an instruction string to be executed, and instruction address holding means for holding an address of the instruction being executed, and said first interrupt requesting means compares the address specified by said instruction address specifying means and the address held by said instruction address holding means with each other, and informs said first interrupt request when the compared result shows coincidence.

4. A data processor as set forth in claim 1, wherein said instruction executing means comprises instruction address specifying means for specifying an address of an optional instruction in an instruction string to be executed, and instruction address holding means for holding an address of an instruction next to the instruction being executed, and said first interrupt requesting means compares the address specified by said instruction address specifying means and the address held by said instruction address holding means with each other, and informs said first interrupt request when the compared result shows coincidence.

5. A data processor as set forth in claim 1, wherein said instruction executing means comprises mask level storing means for storing a mask level for restraining said third interrupt request, and said third interrupt requesting means comprises:

a plurality of fourth interrupt requesting means for respectively informing fourth interrupt requests generated on the basis of a plurality of fourth interrupt factors to which priority levels are given respectively and which requests fourth interrupt processings being different from each other to activate;

a plurality of priority level holding means for holding the respective priority levels corresponding to said plurality of fourth interrupt factors;

priority judging means for, when said fourth interrupt requests are generated, judging the highest priority level among them; and third interrupt request deciding means for detecting the case where the priority level judged by said priority judging means is higher than the mask level stored in said mask level storing means, and informing as said third interrupt request the fourth interrupt request corresponding to the detected priority level.

6. A data processor as set forth in claim 5, wherein said controlling means makes said mask level storing means store a mask level of the highest level when said first or second interrupt processings are activated, and makes said mask level storing means store the priority level by said priority judging means when said third interrupt processing is activated.

* * * * *